US012767871B2

(12) United States Patent
Kim

(10) Patent No.: US 12,767,871 B2
(45) Date of Patent: Oct. 20, 2026

(54) METHOD FOR MANUFACTURING HEAT DISSIPATION SHEET USING WASTE GRAPHITE

(71) Applicant: NTS CO., LTD, Cheonan-si (KR)

(72) Inventor: Gwang Su Kim, Hwaseong-si (KR)

(73) Assignee: NTS CO., LTD, Cheonan-si (KR)

( * ) Notice: Subject to any disclaimer, the term of this patent is extended or adjusted under 35 U.S.C. 154(b) by 806 days.

(21) Appl. No.: 18/006,846

(22) PCT Filed: Jul. 29, 2021

(86) PCT No.: PCT/KR2021/009847
§ 371 (c)(1),
(2) Date: Jan. 25, 2023

(87) PCT Pub. No.: WO2022/025652
PCT Pub. Date: Feb. 3, 2022

(65) Prior Publication Data

US 2023/0303903 A1 Sep. 28, 2023

(30) Foreign Application Priority Data

Jul. 30, 2020 (KR) ........................ 10-2020-0095136

(51) Int. Cl.
*C09K 5/14* (2006.01)
*C01B 32/225* (2017.01)

(52) U.S. Cl.
CPC .............. *C09K 5/14* (2013.01); *C01B 32/225* (2017.08)

(58) Field of Classification Search
CPC ......... C09K 5/14; C01B 32/21; C01B 32/215; C01B 32/22; C01B 32/225; C04B 35/528; C04B 35/536
See application file for complete search history.

(56) References Cited

U.S. PATENT DOCUMENTS 3,404,061 A 10/1968 Shane et al.
4,057,514 A * 11/1977 Huschka ............... C04B 35/532 252/502
4,075,114 A * 2/1978 Ishikawa ............... C04B 35/536 252/62
4,094,951 A * 6/1978 Ishikawa ............... C01B 32/225 501/99

(Continued)

FOREIGN PATENT DOCUMENTS

CN 110171823 A * 8/2019 ........... C01B 32/225
CN 111149442 A 5/2020

(Continued)

OTHER PUBLICATIONS

International Search Report, mailed Nov. 23, 2021, for International Patent Application No. PCT/KR2021/009847. (6 pages).

*Primary Examiner* — Matthew R Diaz
(74) *Attorney, Agent, or Firm* — Seed IP Law Group LLP

(57) ABSTRACT

According to the present invention, when manufacturing expandable graphite, it is possible to remarkably reduce the generation of waste acid and waste and economically manufacture expandable graphite having a low content of volatile substances and good appearance, and thus, it is possible to efficiently manufacture a heat dissipation sheet having excellent thermal conductivity.

11 Claims, 5 Drawing Sheets

(56) References Cited

U.S. PATENT DOCUMENTS

| | | | | |
|---|---|---|---|---|
| 2007/0107551 | A1* | 5/2007 | Klett | C21C 1/08 75/770 |
| 2007/0110661 | A1* | 5/2007 | Hirose | C09K 5/14 423/448 |
| 2008/0193767 | A1* | 8/2008 | Lee | C01B 32/225 428/408 |
| 2009/0301697 | A1* | 12/2009 | Hirose | C01B 32/225 165/185 |
| 2014/0190676 | A1* | 7/2014 | Zhamu | C09K 5/14 165/185 |
| 2015/0284253 | A1* | 10/2015 | Zhamu | C09K 5/14 423/448 |
| 2018/0126693 | A1* | 5/2018 | Tsukamoto | C01B 32/225 |
| 2020/0260614 | A1* | 8/2020 | Kim | C01B 32/225 |

FOREIGN PATENT DOCUMENTS

| | | | | | |
|---|---|---|---|---|---|
| EP | 0406008 | A1 | * | 1/1991 | C04B 35/536 |
| JP | H05141868 | A | * | 6/1993 | |
| JP | 2566244 | B2 | | 12/1996 | |
| JP | 11106268 | A | | 4/1999 | |
| JP | H11106268 | A | | 4/1999 | |
| JP | 2005123194 | A | | 5/2005 | |
| JP | 2006137860 | A | * | 6/2006 | |
| JP | 5159073 | B | | 3/2013 | |
| JP | 2017095783 | A | | 6/2017 | |
| JP | 2018052751 | A | | 4/2018 | |
| KR | 20040082260 | A | | 9/2004 | |
| KR | 100971780 | B1 | * | 7/2010 | C09K 5/14 |
| KR | 20120074694 | A | | 7/2012 | |
| KR | 20150015950 | A | * | 2/2015 | C01B 32/225 |
| KR | 20150021460 | A | * | 3/2015 | H05K 7/20472 |
| KR | 20180071740 | A | | 6/2018 | |
| KR | 101897980 | B1 | | 9/2018 | |
| KR | 20190073711 | A | | 6/2019 | |
| KR | 102183485 | B1 | | 11/2020 | |
| RU | 2684383 | C1 | | 4/2019 | |
| WO | WO-2019066543 | A1 | * | 4/2019 | H05K 7/20472 |

* cited by examiner

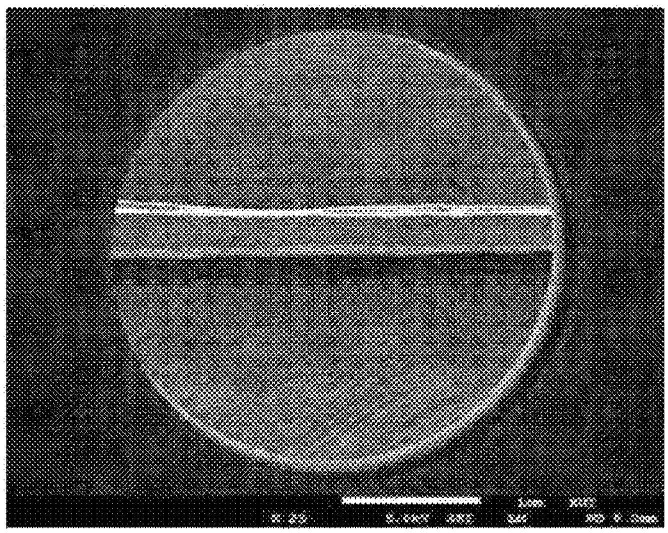

FIG. 6

| | First | Second | Third | Fourth | Fifth (Optimal) |
|---|---|---|---|---|---|
| 1 hr | | | | 500 °C | 500 °C |
| 2 hr | | | 500 °C | 500 °C | 500 °C |
| 3 hr | | 500 °C | 500 °C | 500 °C | 500 °C |
| 4 hr | 500 °C | 500 °C | 500 °C | 800 °C | 900 °C |
| 5 hr | 500 °C | 500 °C | 800 °C | 900 °C | 900 °C |
| 6 hr | 500 °C | 800 °C | 900 °C | 1000 °C | 900 °C |
| 7 hr | 800 °C | 900 °C | 1000 °C | 1100 °C | 900 °C |
| 8 hr | 900 °C | 1000 °C | 1100 °C | | |
| 9 hr | 1000 °C | 1100 °C | | | |
| 10 hr | 1100 °C | | | | |
| Remaining amount | about 50% | about 60% | about 70% | about 80% or more | about 80% or more |

* Remaining amount (%) = the amount of powder remaining after evaluation / the amount of powder before evaluation × 100

* The shaded areas indicate the section where the temperature was maintained

FIG. 7

METHOD FOR MANUFACTURING HEAT DISSIPATION SHEET USING WASTE GRAPHITE

TECHNICAL FIELD

The present invention relates to a method for manufacturing a heat dissipation sheet using waste graphite collected from a secondary cell, a fuel cell, and the like.

BACKGROUND ART

As electronic products become more high-performance and smaller, electronic components installed inside are pursuing larger capacity and higher integration. As a result, a lot of heat is generated in electronic products, which requires a system for emitting heat generated inside the product to the outside or cooling it itself.

As a heat cooling method for electronic products, a method of installing a heat pipe or a heat dissipation fan is known. In the case of a heat pipe, the amount of heat that the heat pipe can emit is smaller than the amount of heat emitted from the heating element of the electronic product, and the efficiency is poor. In addition, in the case of installing a heat dissipation fan, there are noise and vibration, and problems that go against the demand for thinning and light weight.

Therefore, it is common to use heat dissipation sheets for electronic products that require thinning and light weight, and heat dissipation sheets are manufactured in the form of natural and artificial graphite compressed sheets, polymer ceramic composite sheets, and the like. In particular, a graphite-based heat dissipation sheet having an excellent thermal conductivity is widely used.

However, in the case of a graphite-based sheet, although a natural graphite-based sheet is inexpensive, its thermal conductivity is not relatively high because it is located between an aluminum plate and a copper plate. In addition, in order to match the thickness of the heat dissipation plate, a relatively thick (approximately 0.7 mm to 2 mm) sheet must be used, but in this case, there is a limit in that the thermal conductivity is significantly lowered.

The artificial graphite-based sheet cannot be made into a thick sheet due to the nature of the raw material (polyimide film), and since a large amount of energy is required for graphitization, the price is expensive and it is difficult to apply it to a large area.

Therefore, in order to solve the problems of existing graphite-based heat dissipation sheets, development of heat dissipation sheets having an excellent thermal conductivity and capable of being manufactured economically has been required in the related art.

On the other hand, the use of a secondary cell and a fuel cell is increasing as electric vehicles, electric motorcycles, and the like are increasing in line with the recent eco-friendly policies for automobiles and generators. Waste secondary cells and waste fuel cells that have reached the end of their lifespan are sorted out into valuable metals (Ni, Cr, Fe, etc.) for each component, and are disassembled and recycled through recycling companies. In this process, recycling methods of waste graphite collected from an anode material of a secondary cell, a separator of a fuel cell, and the like have been sought in various ways.

For example, a method of recycling waste graphite into a floor heating structure (Korean Patent No. 1897980), a method of recovering waste graphite material from the fabrication process of semiconductor manufacturing components and using it as an electrode material (Korean Patent Application Publication No. 2018-0071740 and Korean Patent Application Publication No. 2019-0073711) and the like have been attempted. However, a technology utilizing waste graphite for manufacturing a heat dissipation sheet has not yet been known.

DETAILED DESCRIPTION OF INVENTION

Technical Problem

Accordingly, the present inventors have developed a technology capable of economically manufacturing a heat dissipation sheet having excellent thermal conductivity while minimizing the release of environmental pollutants by utilizing waste graphite, thereby completing the present invention.

Therefore, an object of the present invention is to provide a method for manufacturing a heat dissipation sheet, comprising the steps of pulverizing a graphite material comprising waste graphite, optionally intercalating the graphite material, and then subjecting it to the heat treatment to produce a sheet.

Solution to Problem

In order to achieve the above object, in one aspect of the present invention, there is provided a method for manufacturing a heat dissipation sheet, comprising the steps of: pulverizing a graphite material comprising waste graphite to produce a powder containing waste graphite; optionally an intercalation step of adding and stirring a strong acid and an oxidizing agent to the powder containing waste graphite; subjecting the intercalated powder containing waste graphite to the heat treatment at 900° C. to 1100° C. for 3 to 5 hours; and pressurizing the expandable graphite obtained after heat treatment to produce a sheet. Hereinafter, each step of the method for manufacturing a heat dissipation sheet according to the present invention will be described.

1. Step of Producing Powder Containing Waste Graphite

In the method for manufacturing a heat dissipation sheet of the present invention, a graphite material composed of waste graphite alone or a blend of waste graphite and any one or more of artificial graphite, kish graphite, carbon nanotube and carbon fiber may be used as a raw material.

In particular, the waste graphite used in the present invention may be waste graphite that remains after separating an anode material (including artificial graphite, natural graphite, low crystalline carbon components, etc.) from components of a waste lithium secondary cell and valuable metals from a separator material of a waste fuel cell, etc. As such, waste graphite collected from a waste secondary cell and a waste fuel cell is high-purity graphite with low impurity content. Further, as it is manufactured as a component of a secondary cell and a fuel cell and partially intercalated, when only waste graphite is used as a graphite material, the pulverized waste graphite powder may be heat-treated according to the present invention without an intercalation step and used for the manufacture of a heat dissipation sheet.

A lithium secondary cell, which is currently widely used, is composed of a cathode material, an anode material, a separator membrane, and an electrolyte solution, among which the constituent part comprising graphite is an anode material. The anode active material of the anode materials consists of artificial graphite, natural graphite, low crystalline carbon, metal, and the like, and graphite accounts for about 11.5% of the total weight.

A secondary cell generates electricity with a structure in which lithium ions move back and forth between a cathode and an anode in an electrolyte solution composed of lithium salts ($LiPF_6$, $LiBF_4$, $LiClO_4$) and organic solvents (EC, PC, DMC, DEC, etc.) to charge and discharge electricity. In this case, intercalation occurs as the lithium salt moves to an anode containing graphite.

In addition, the separator of a fuel cell (hydrogen generator) is an electrically conductive plate having a gas flow path for an anode on one side and a gas flow path for a cathode on the other side. Recently, a composite material obtained by press-molding graphite powder with a binder and then sintering is used as a separator. Therefore, the separator of a waste fuel cell is in a state in which a polymer resin such as polyvinylidene fluoride used as a binder is included (intercalated).

When manufacturing a powder containing waste graphite, if conventional heat dissipation is required depending on the device to which the heat dissipation sheet is applied, it is possible to economically manufacture a heat dissipation sheet with a large area by using waste graphite alone. Alternatively, in the case of a heat dissipation sheet with a small area requiring a higher level of heat dissipation performance, the purity of carbon can be increased by using a blend of waste graphite and any one of artificial graphite, kish graphite, carbon nanotube and carbon fiber. Preferably, waste graphite and any one or more of artificial graphite, kish graphite, carbon nanotube and carbon fiber are blended in a weight ratio of 90:10 to 60:40. As an example, when waste graphite and kish graphite are blended, they can be used not only for the production of a heat dissipation sheet but also for the manufacture of a material which is better with a higher carbon content, such as a recarburizer.

When blending a mixture of waste graphite and artificial graphite, kish graphite, carbon nanotube and carbon fiber, a preferred weight ratio may be 90:10 to 70:30. For example, in the manufacturing method of the present invention, waste graphite:artificial graphite or kish graphite may be mixed in a weight ratio of 90:10 or 60:40, or waste graphite:carbon nanotube:carbon fiber may be mixed in a weight ratio of 80:10:10, or waste graphite:artificial graphite:kish graphite: carbon nanotube:carbon fiber may be mixed in a weight ratio of 70:10:10:5:5 or 60:10:20:5:5, or waste graphite:artificial graphite:kish graphite may be mixed in a weight ratio of 80:10:10.

In addition, a graphite material comprising waste graphite is preferably pulverized to have various particle diameters with an average particle diameter of about 500 μm within a particle diameter range of 0.5 μm to 1000 μm. Any means known in the art, such as an air jet mill, may be used for pulverizing the graphite material.

2. Intercalation Step

An intercalation compound obtained by intercalating chemicals such as sulfuric acid and nitric acid between graphite layers in the presence of an electrolytic treatment or an oxidizing agent is referred to as a lamellar compound. When this is heat-treated again, expandable graphite in which graphite molecules are expanded tens to hundreds of times in the C-axis direction may be manufactured.

According to the manufacturing method of the present invention, a powder containing waste graphite obtained by pulverizing a graphite material comprising waste graphite may be intercalated by a strong acid and an oxidizing agent. This intercalation step may or may not be performed depending on the raw material of the graphite material. When the manufacturing method of the present invention is performed with the powder obtained by pulverizing only the waste graphite, the intercalation step may be omitted because the waste graphite itself is already intercalated as a component of a secondary cell, a fuel cell, and the like. However, in the case of heat treatment of a large amount of powder of tens of kg or more, an intercalation step may be performed in order to increase the expansion efficiency of graphite even when using powder obtained by pulverizing only the waste graphite.

Preferably, as the strong acid of the present invention, any one or more of sulfuric acid or nitric acid may be used, and as an oxidizing agent, sodium dichromate ($Na_2Cr_2O_7$), potassium permanganate ($KMnO_4$) and hydrogen peroxide ($H_2O_2$), more preferably potassium permanganate may be used.

The sulfuric acid and/or nitric acid and potassium permanganate may be added in an amount of 20% to 40%, more preferably 30%, based on the weight of the powder containing waste graphite. In this case, the ratio of sulfuric acid and/or nitric acid and potassium permanganate will be appropriately selected by those of ordinary skill in the art in consideration of the fact that potassium permanganate acts as an oxidizing agent.

There was a problem such as waste disposal by adding a large amount of acid and various oxidizing agents in the manufacture of the conventional expandable graphite. However, in the present invention, since waste graphite, which has already been intercalated, is used as a raw material, the generation of waste such as waste acid can be remarkably reduced, and thus, a heat dissipation sheet can be manufactured in an environmentally friendly manner.

Specifically, sulfuric acid and/or nitric acid and potassium permanganate are mixed with a powder containing waste graphite, and then appropriately stirred with a stirrer to produce a lamella compound. For example, stirring may be performed using a high viscosity stirrer at 1000 rpm to 2000 rpm for about 1 to 3 hours, and more preferably for about 2 hours.

3. Step of Heat Treatment

According to the manufacturing method of the present invention, in the case of using the intercalated powder containing waste graphite or only waste graphite, in some cases, expandable graphite may be manufactured by heat treating the pulverized waste graphite powder, which has not undergone an intercalation step, at 900° C. to 1100° C. According to the manufacturing method of the present invention, it was found that a powder containing waste graphite can be uniformly heat treated at a heat treatment temperature of 900° C. to 1100° C. to smoothly release volatile substances while minimizing oxidation of the graphite powder.

More preferably, the two-step heat treatment further comprising the step of elevating the temperature to 500° C. for 1 hour, maintaining the temperature for 2 hours, and then elevating the temperature to 900° C. for 1 hour before subjecting it to the heat treatment at 900° C. to 1100° C. for 3 to 5 hours may be performed. By performing the two-step heat treatment as described above, volatile substances may be efficiently removed from a composite powder containing waste graphite, and the final expandable graphite may be obtained in a high yield, and economical heat treatment is possible.

In addition, in the heat treatment step of the present invention, water may be disposed under the powder to allow water vapor to pass between a powder containing waste graphite, and heat treatment may be performed. For example, before loading the powder into the container, a certain amount of water may be sprinkled on the bottom of the container, and heat treatment may be performed after loading a powder containing waste graphite. In this case, the amount of water may be 5 L to 20 L, preferably 5 L to 15 L, more preferably 10 L per ton of the composite powder. In this case, as the water vapor turns into vapor and escapes, it forms an air path between the loaded powders, and volatile substances are discharged more smoothly through this path, and final powder having a suitable size and good surface condition may be obtained.

Preferably, the heat treatment step of the present invention is performed in a facility for manufacturing expandable graphite constructed suitably for the manufacturing method of the present invention, which will be described later.

4. Step of Manufacturing Sheet

According to the manufacturing method of the present invention, after cooling the heat treated expandable graphite to an appropriate temperature, a plate-shaped heat dissipation sheet is manufactured through a pressurizing process. For pressurizing, any means widely used in the art, such as a roller, may be used.

The heat dissipation sheet of the present invention may be manufactured to have various thicknesses depending on the purpose of use, the target value of thermal conductivity, and the like. For example, it may be manufactured to have a thickness of 5 μm to 2000 μm, preferably 10 μm to 1000 μm, and more preferably 50 μm to 300 μm.

In one aspect of the present invention, there is provided an expandable graphite manufacturing facility for performing heat treatment of a powder containing waste graphite.

The facility for manufacturing expandable graphite according to the present invention may comprise a container in which graphite bricks and refractory bricks in a ratio of 5:5 to 8:2 are bonded with a bonding agent, the graphite bricks are disposed in the center part and/or the lower part of the container, and the outer wall of the container is surrounded by austenitic stainless steel; an airtight furnace for heating the container by electricity or liquefied petroleum gas; and a gas collecting and dust collecting facility disposed at an upper part of the airtight furnace to communicate with the inside of the airtight furnace.

First, in the process of manufacturing expandable graphite according to the manufacturing method of the present invention, since a large amount of corrosive gas is generated due to the acid component contained in the waste graphite and the acid component included in the intercalation process and the like, the present inventors have devised a special container capable of withstanding this.

The special container according to the present invention is manufactured by bonding graphite bricks and refractory bricks with a bonding agent to form a container body and surrounding the outer wall of the container by austenitic stainless steel.

In this case, the best heat transfer efficiency may be achieved by regulating the ratio of graphite bricks and refractory bricks to 5:5 to 8:2. When the graphite brick is disposed in the center part or the lower part of the container, it is advantageous that heat is evenly transferred and an air path between the loaded powders is well formed to allow smooth heat treatment. In the case of graphite bricks, because of their high thermal conductivity, they have the effect of minimizing the loss of thermal energy and rapidly elevating the temperature to a certain level, so the efficiency can be maximized by using refractory bricks and graphite bricks in combination.

In addition, in order to firmly bond graphite bricks and refractory bricks, by using a mixture of a graphite powder having a particle diameter of 1 μm or less in a refractory mortar capable of withstanding a high temperature of 1000° C. or higher in an amount of 20 to 50% based on the weight of the refractory mortar, the container lifespan could be increased tenfold or more.

In addition, a lid made of a heat-resistant/oxidation-resistant material may be installed in the special container to prevent scattering of powder during heat treatment.

In the facility of the present invention, heat treatment may be performed by loading a powder containing waste graphite in the special container and putting it into an airtight furnace.

As an airtight furnace, any airtight furnace for heating with electricity or liquefied petroleum gas may be used, and an electric furnace may be used preferably.

The airtight furnace may comprise a gas collecting and dust collecting facility disposed at an upper part to communicate with the inside of the airtight furnace.

Preferably, a heat-resistant and acid-resistant paint may be applied to the inside of the exhaust pipe of the gas collecting and dust collecting facility so as to withstand the discharge of hot corrosive gas inside of the airtight furnace. Optionally, a special fan may be installed in the gas collecting and dust collecting facility to smoothly discharge volatile substances. The installation position and material of the exhaust pipe and fan may be appropriately modified as needed by those of ordinary skill in the art.

In addition, the facility for manufacturing expandable graphite of the present invention may further comprise a transport facility for transporting the heat treated powder. The transport facility of the present invention may comprise an intake part, a transfer pipe, a loading part, and an ejection port. After the heat treatment is completed, the container inside the airtight furnace is taken out, cooled to an appropriate temperature, and then moved to a transport facility using an appropriate transportation means such as a rail. The powder is sucked through the intake part in the transport facility, loaded in the loading part through the transfer pipe, and then ejected through the ejection port and put into an appropriate storage container (for example, a ton bag). Since the heat treated composite powder has a low moisture content and is a fine powder, it is difficult to smoothly transport the powder with a general tool, so it is preferable to use a transport facility that can suck the powder and put it in an exclusive loading container, as in the present invention.

In another aspect of the present invention, there is provided a heat dissipation sheet manufactured according to the manufacturing method of the present invention.

The expandable graphite manufactured according to the manufacturing method of the present invention uses high-purity waste graphite collected from a waste secondary cell, a waste fuel cell, and the like as a raw material, has a very low content of volatile substances, and has an excellent appearance of the obtained powder, so it can show a high compression ratio during compression molding. Therefore, thermal conductivity is improved, and excellent performance as a heat dissipation sheet can be achieved.

In another aspect of the present invention, there is provided an electrical and electronic product comprising the heat dissipation sheet according to the present invention.

The heat dissipation sheet of the present invention may be used for an electronic device, an electronic device case, a lighting device, a battery, a battery case, or an EMI gasket, or the like.

The above electronic device may be a mobile phone, a desktop PC, a laptop PC, a tablet PC, a virtual reality (VR) device, a set-top box, a portable game device, an external hard drive, an MP3 player, a beam projector, a television (LED, OLED, etc.), a monitor, a vehicle black box, a vehicle navigation, a communication device, a power converter, a power supply device, or a medical electronic device.

In addition, the lighting device may be an LED lighting device or a light bulb.

Preferably, the electrical and electronic article of the present invention may have a heat source that generates heat through an electrical/electronic action or a chemical action, and may include, for example, an electronic element, a circuit board, or a light source.

As an embodiment of the present invention, the heat dissipation sheet of the present invention may be directly attached to the surface of the heat source, attached to the surface of a heat sink in close contact with the heat source, or attached to an exterior material of an article adjacent to the heat source.

Effects of Invention

According to the present invention, when manufacturing expandable graphite, it is possible to remarkably reduce the generation of waste acid and waste and economically manufacture expandable graphite having a low content of volatile substances and a good appearance, and thus, it is possible to efficiently manufacture a heat dissipation sheet having excellent thermal conductivity.

BRIEF DESCRIPTION OF DRAWINGS

FIG. 6 shows a cross section of a heat dissipation sheet manufactured according to an embodiment of the present invention.

FIG. 7 is a table showing the remaining amount of powder measured by setting 500° C. as the first heating temperature and varying the time taken for the heating, the second heating temperature and the like.

MODE FOR CARRYING OUT THE INVENTION

Although described with reference to preferred embodiments of the present invention, the present invention is not limited thereto, and various modifications and changes may be made to the present invention without departing from the spirit and scope of the present invention described in the claims, detailed description and accompanying drawings.

Example 1. Construction of Expandable Graphite Manufacturing System Utilizing Waste Graphite

Example 1-1. Manufacture of Special Container for Manufacturing Expandable Graphite A special container for manufacturing expandable graphite was produced to withstand a large amount of corrosive gas generated by the acid component included in the waste graphite and the intercalant included in the pretreatment process, etc. The size of the container was designed so that the powder can be loaded at a level of about 1 ton in consideration of economic feasibility.

Steel (1st generation), austenitic stainless steel (SUS 304), refractory brick (3rd generation) and heat-resistant treated graphite brick (4th generation) were tested as materials for the container, but all of them failed to manufacture the container because of problems such as oxidation of the container due to corrosive gas and lack of heat-resistant performance. Accordingly, by analyzing the above failure examples, a special container was manufactured using a combination of graphite brick, refractory brick and austenitic stainless steel (SUS).

First, the SUS plate was made to cover the outermost part of the container so that the structure of the container would not collapse or the block structure would not expand due to heat when heat was applied, and the inside of the container was produced using refractory bricks and graphite bricks.

In this case, as a result of varying the mixing ratio of graphite bricks and refractory bricks, it was found that the best heat transfer was achieved when the ratio of graphite bricks:refractory bricks was 5:5 to 8:2. In addition, as a result of the experiment, it was found that the positions of the graphite bricks and the refractory bricks are important, and it was found that when the graphite bricks are disposed in the center part or the lower part of the container, the heat is evenly transferred and the air path between the loaded powders is well formed to allow smooth heat treatment.

Figure 1A:
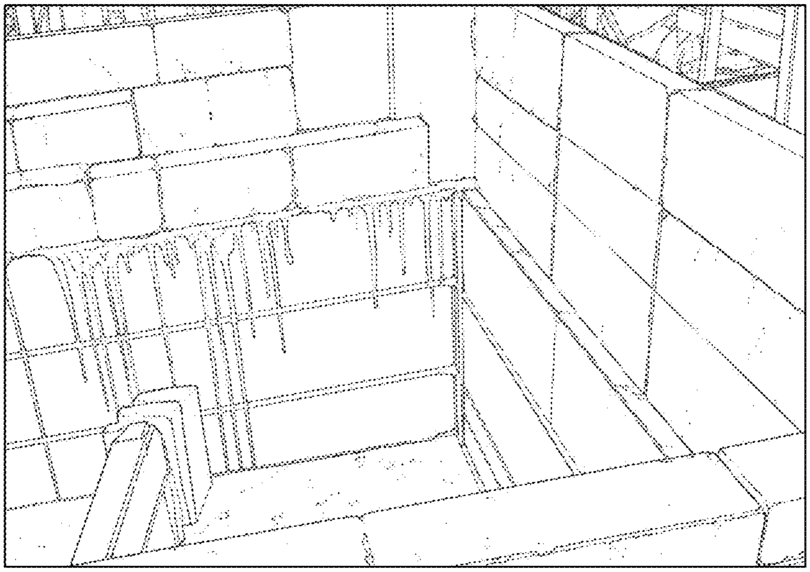
FIG. 1 shows the special container of the facility for manufacturing expandable graphite of the present invention.
Figure 1B:
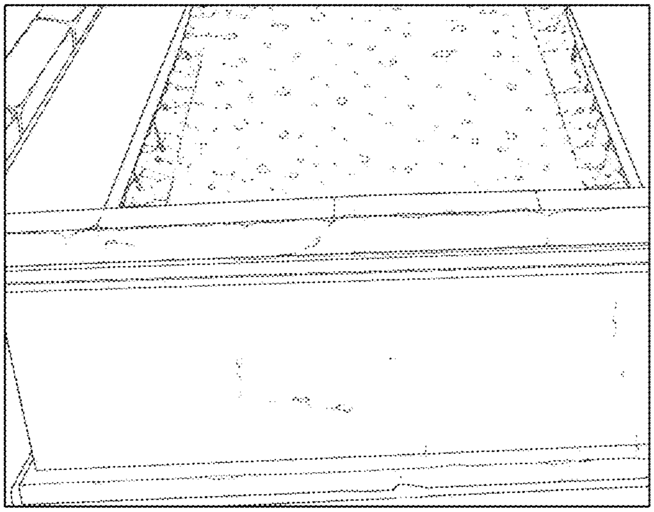

On the other hand, in the case of using a general refractory mortar, a brick collapse phenomenon occurred due to volatile substances and heat when subject to heat treatment three or more times. In order to solve this problem, about 20% to 50% of refined graphite powder with a particle diameter of 1 μm or less was mixed in a special refractory mortar (Chosun Refractories, Super 3000) capable of withstanding at 1000° C. or higher, thereby increasing the lifespan of the container by more than 10 times, and thus a container that can be used more than about 30 times could be manufactured. The special container manufactured in this example is as shown in FIG. 1.

In addition, the lid of the container was produced in an oval shape to facilitate the discharge of gas from the inside of the container, and the lid of the container was made of the lightest refractory bricks, and SUS and a steel plate to withstand high temperature heat and volatile substances.

Example 1-2. Production of Dry Distillation Facility

First, a conveyor method was introduced as a dry distillation method. A heat source was disposed in the middle of the conveyor, and composite graphite powder was placed in the container manufactured in Example 1-1 and then slowly moved to manufacture expandable graphite. However, there was a problem in that it was not easy to dispose of the gas generated during dry distillation and a lot of cost was consumed.

Figure 2A:
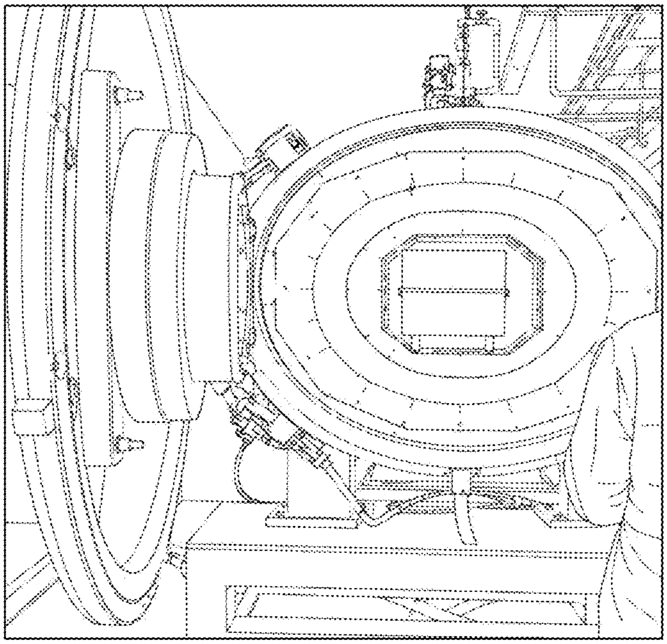
FIG. 2 shows an electric furnace into which a special container is put in the facility for manufacturing expandable graphite of the present invention.
Figure 2B:
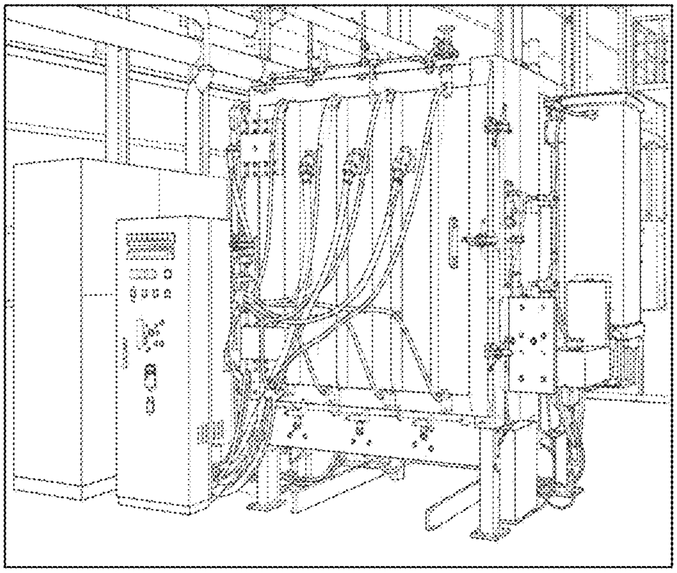

Therefore, dry distillation was performed by adopting an electric furnace method as shown in FIG. 2. In this case, the internal space was sealed, and it was easy to construct a ventilation system capable of discharging the gas generated inside at the elevated temperature to the outside.

Example 1-3. Production of Ventilation Facility

Figure 3:
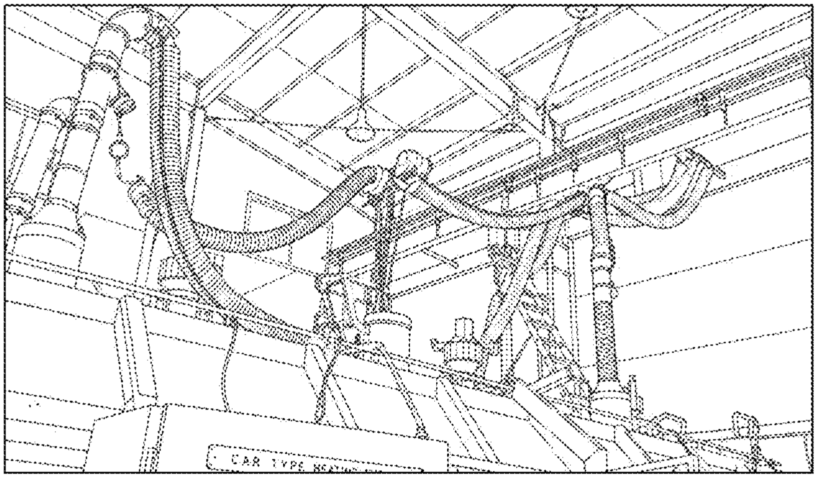
FIG. 3 shows a gas collecting and dust collecting facility connected to the electric furnace of FIG. 2.

A gas collecting and dust collecting system as shown in FIG. 3 was provided at an upper part of the electric furnace, a special fan was installed to facilitate the discharge of gas and moisture, and an exhaust pipe coated with a special heat-resistant/acid-resistant paint was produced to prevent corrosion due to heat and gas.

Example 1-4. Production of Transport Facility

Figure 4A:
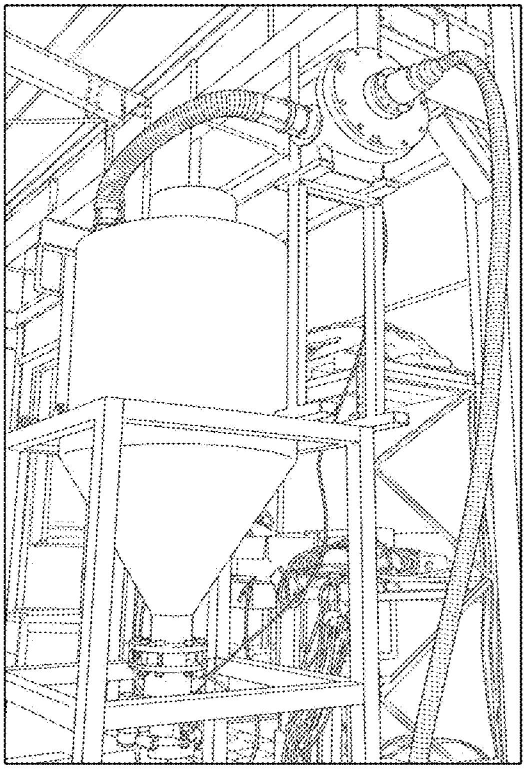
FIG. 4 shows a transport facility that can be optionally added to the facility for manufacturing expandable graphite of the present invention.
Figure 4B:
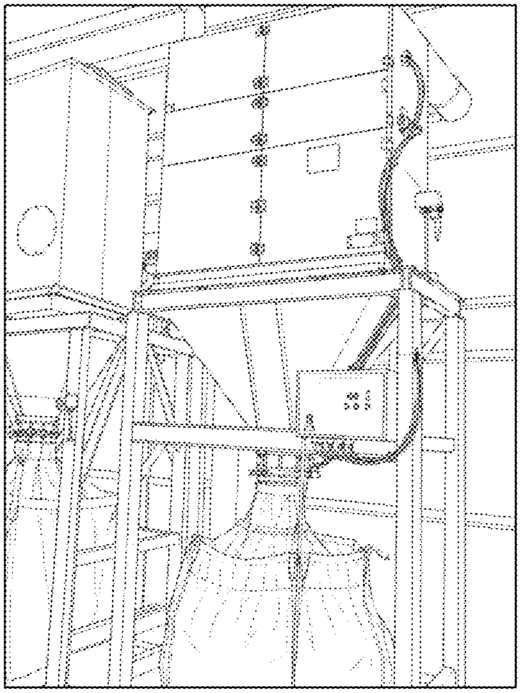

Since the heat-treated powder is a fine powder with a low moisture content, a transport facility that can suck the powder and put it in an exclusive loading container was separately manufactured in order to prevent the powder from flying or contaminating the surroundings. As shown in FIG. 4, the produced transport facility is equipped with an intake part, a transfer pipe, a loading part, and an ejection port, and it was designed so that the powder was sucked through the intake part, loaded in the loading part through the transfer pipe and then ejected through the ejection port to be contained in the tone bag.

Example 2. Manufacture of Expandable Graphite

Example 2-1. Preparation of Graphite Material Comprising Waste Graphite

Waste graphite from a waste lithium secondary cell and a waste fuel cell was collected from recycling companies, and thus waste graphite, artificial graphite and kish graphite were mixed in a weight ratio of 80:10:10.

The blended composite powder was pulverized by an air jet mill (KMTech, JM-500) for about 2 minutes per kg to have an average particle diameter of about 0.5 mm and a wide particle size distribution.

Example 2-2. Pretreatment Before Expansion (Intercalation)

Sulfuric acid, nitric acid, and potassium permanganate were added in an amount of about 30% by weight of the powder to the powder containing waste graphite obtained in Example 2-1, and stirred for about 2 hours at 1000 rpm to 2000 rpm in a high viscosity stirrer to produce a lamellar compound.

Example 2-3. Manufacture of Expandable Graphite

Using the facility for manufacturing expandable graphite constructed in Example 1, the lamella compound powder obtained in Example 2-2 was put into a container, and the container was put into an electric furnace and heated. Heat treatment was carried out under optimal manufacturing conditions confirmed in Experimental Example 1 below (i.e., elevating the temperature to 500° C. over 1 hour, having the maintaining time of 2 hours, elevating the temperature to 900° C. over 1 hour, and then subjecting the powder to the heat treatment for 3 hours).

Example 2-4. Manufacture of Heat Dissipation Sheet

The heat treated expandable graphite was cooled, and then a plate-shaped heat dissipation sheet was manufactured through a pressurizing process. The pressurizing was carried out by rolling 1 to 5 times with a roller to manufacture a sheet having a thickness of 50 μm and 300 μm.

Experimental Example 1. Evaluation of Manufacturing Efficiency Depending on Temperature and Duration of Heat Treatment The content of volatile substances (including moisture) was measured by varying the temperature and duration of heat treatment, and the results are shown in Table 1 below.

TABLE 1

| | Content (%) of volatile substances* | |
|---|---|---|
| Temperature | 7 Hr | 10 Hr |
| Room temperature | 0.50% or more | 0.50% or more |
| 500° C. | 0.30% | 0.29% |
| 600° C. | 0.20% | 0.17% |
| 700° C. | 0.17% | 0.16% |
| 800° C. | 0.09% | 0.08% |
| 900° C. | 0.03% | 0.02% |
| 1000° C. | 0.02% | 0.02% |
| 1100° C. | 0.01% or less | 0.01% or less |

* Content (%) of volatile substances = (m − ml)/m * 100 m is the mass before heat treatment, and ml is the mass after heat treatment (measured after 1 hour at 400° C. ± 20° C.)

As a result, it was confirmed that a significant amount of volatile substances remained regardless of the heating time when the temperature inside the electric furnace ranged from 500° C. to 800° C. It was confirmed that heating should be performed at least 900° C. or higher in order to reduce the volatile substances in the graphite powder to 0.02% or less, which is the target value. In addition, since the oxidation of the graphite powder increases rapidly when the temperature inside the electric furnace becomes 1100° C. or higher, it was confirmed that the optimal temperature for manufacturing expandable graphite in the manufacturing process of the present invention is 900° C. to 1100° C.

On the other hand, it was found that in the manufacturing process of the present invention, if the heat treatment temperature is elevated vertically at once, the powder on the surface of the electric furnace is quickly oxidized or dried, and the inner powder is relatively less dried, thereby causing problems with the total content and the yield of expandable graphite after dry distillation.

Accordingly, the remaining amount of the powder was measured by setting 500° C. as the first heating temperature and varying the time taken for the heating, the second heating temperature and the like. The results are shown in FIG. 7.

From the results of FIG. 7, it can be seen that elevating the temperature to 500° C. over 1 hour is the most efficient when considering both the economic aspect and the yield of the powder.

Furthermore, as a result of the experiments where the maintaining time was regulated after elevating the temperature to 500° C. over 1 hour, it was found that, in comprehensive consideration of the removal of volatile substances, the even transfer of heat, the yield of powder, economic feasibility, and the like, the best manufacturing conditions were achieved by having a maintaining time of 2 hours and elevating the temperature for 1 hour to 900° C., which is determined as the optimal temperature for manufacturing expandable graphite in the manufacturing process of the present invention. In addition, it was found that the optimal maintaining time at 900° C. was 3 hours.

Experimental Example 2. Confirmation of Improvement in Manufacturing Efficiency Depending on Moisture Treatment Expandable graphite was manufactured according to Example 2 using the manufacturing system of Example 1, and 10 kg (10 L) of water per ton of powder was sprinkled on the lower part of the container, and the intercalated powder containing waste graphite was filled thereon and heated. As shown in Table 3 below, it was found that the volatile substances were discharged much better and the appearance of the obtained powder was excellent compared to the case where the water filling process was not carried out.

TABLE 3

| | Content of volatile substances | Condition of powder |
|---|---|---|
| Without moisture | 0.06% | The grain surface is very rough and not neat |
| With moisture | 0.03% | Appropriate size and good surface condition |

Considering the above results, it is believed that as the moisture escapes as vapor, it forms an air path between the loaded powders, through which heat is more efficiently transferred and volatile substances are better discharged. In particular, it is considered that since graphite bricks having high thermal conductivity were disposed in the lower part of the container according to Example 1, the air path was well formed at a low temperature by speeding up heat transfer.

Experimental Example 3. Evaluation of Thermal Conductivity of Heat Dissipation Sheet The sheet produced in Example 2-4 was compared and evaluated for thermal conductivity with a commercially available sheet. The DSN (JIANGXI DASEN TECHNOLOGY CO., LTD) product used as a commercially available sheet is a heat dissipation sheet made of expandable graphite, which is manufactured by extracting graphite from graphite minerals dug up in a mine and subjecting it to intercalation with a strong acid ($H_2SO_4$, etc.), according to a conventional method for manufacturing a heat dissipation sheet.

TABLE 4

| No. | Thickness | Tested heat dissipation sheet | Thermal conductivity |
|---|---|---|---|
| Sample 1 | 50 μm | DSN heat dissipation sheet | 239 W/mK |
| Sample 2 | 50 μm | DSN heat dissipation sheet | 240 W/mK |
| Sample 3 | 50 μm | Sheet produced in Example 2-4 | 329 W/mK |

TABLE 5

| No. | Thickness | Tested heat dissipation sheet | Thermal conductivity |
|---|---|---|---|
| Sample 4 | 300 μm | DSN heat dissipation sheet | 250 W/mK |
| Sample 5 | 300 μm | DSN heat dissipation sheet | 250 W/mK |
| Sample 6 | 300 μm | Sheet produced in Example 2-4 | 390 W/mK |

Figure 5:
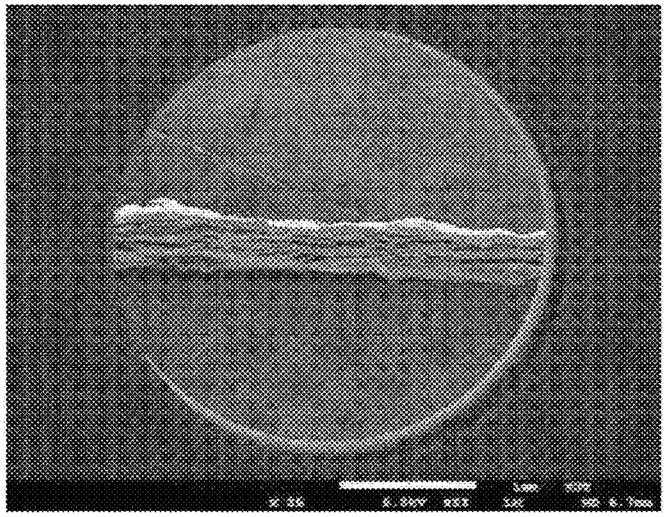
FIG. 5 shows a cross section of a commercially available heat dissipation sheet.

As a result of the experiments, the heat dissipation sheet manufactured according to the manufacturing process of the present invention showed an improvement in the thermal conductivity by about 37 to 56% compared to the control product. Since waste graphite obtained from a secondary cell, a fuel cell, and the like was used as a raw material in the present invention, the content of impurities is very low, and the content of volatile substances in expandable graphite is significantly reduced according to the manufacturing process of the present invention, and the degree of agglomeration of expandable graphite is increased to make the compression rate higher than that of existing products, and thus the thermal conductivity is greatly improved. Comparing FIGS. 5 and 6, it can be seen that the compression rate of the expandable graphite in the sheet is significantly improved in the heat dissipation sheet manufactured according to the present invention, compared to a commercially available heat dissipation sheet.

As described above, the present invention has been described with reference to the preferred embodiments and drawings, but those of ordinary skill in the art should understand that the present invention can be variously modified and implemented without departing from the spirit and scope of the present invention described in the claims of the present invention.

Therefore, the scope of the present invention is not limited to the embodiments of the present invention and should be determined by the contents described in the claims of the present invention.

The invention claimed is:

1. A method for manufacturing a heat dissipation sheet, comprising the steps of:

(1) pulverizing a graphite material comprising waste graphite to produce a powder containing waste graphite;

(2) subjecting the powder containing waste graphite to the heat treatment at 900° C. to 1100° C. for 3 to 5 hours to produce an expandable graphite; and (3) pressurizing the expandable graphite obtained after heat treatment to produce a sheet-, wherein the heat treatment step is performed in a facility for manufacturing expandable graphite comprising:

a container in which graphite bricks and refractory bricks in a ratio of 5:5 to 8:2 are bonded with a bonding agent, the graphite bricks are disposed in the center part and/or the lower part of the container, and the outer wall of the container is surrounded by austenitic stainless steel;

an airtight furnace for heating the container by electricity or liquefied petroleum gas; and a gas collecting and dust collecting facility disposed at an upper part of the airtight furnace to communicate with the inside of the airtight furnace.

2. The method for manufacturing the heat dissipation sheet according to claim 1, further comprising an intercalation step of adding and stirring a strong acid and an oxidizing agent to the powder containing waste graphite between steps (1) and (2).

3. The method for manufacturing the heat dissipation sheet according to claim 2, wherein the strong acid in the intercalation step is any one or more of sulfuric acid and nitric acid, and the oxidizing agent is potassium permanganate.

4. The method for manufacturing the heat dissipation sheet according to claim 3, wherein sulfuric acid, nitric acid and potassium permanganate in the intercalation step are added in an amount of 20% to 40% based on the weight of the powder containing waste graphite.

5. The method for manufacturing the heat dissipation sheet according to claim 1, wherein the graphite material comprising waste graphite is a blend of waste graphite and any one or more of artificial graphite, kish graphite, carbon nanotube and carbon fiber in a weight ratio of 90:10 to 60:40.

6. The method for manufacturing the heat dissipation sheet according to claim 1, wherein the graphite material comprising waste graphite consists of waste graphite.

7. The method for manufacturing the heat dissipation sheet according to claim 1, wherein the graphite material comprising waste graphite is pulverized to have a particle diameter of 0.5 μm to 1000 μm.

8. The method for manufacturing the heat dissipation sheet according to claim 1, wherein the heat treatment step further comprises the step of elevating the temperature to 500° C. for 1 hour, maintaining the temperature for 2 hours, and then elevating the temperature to 900° C. for 1 hour before subjecting the powder containing waste graphite to the heat treatment at 900° C. to 1100° C. for 3 to 5 hours.

9. The method for manufacturing the heat dissipation sheet according to claim 1, wherein in the heat treatment step, water is disposed under the loaded powder containing waste graphite to allow water vapor to pass between the powder, and heat treatment is performed.

10. The method for manufacturing the heat dissipation sheet according to claim 1, wherein the bonding agent is a mixture of a graphite powder having a particle diameter of 1 μm or less in a refractory mortar capable of withstanding a high temperature of 1000° C. or higher in an amount of 20 to 50% based on the weight of the refractory mortar.

11. The method for manufacturing the heat dissipation sheet according to claim 1, wherein the sheet is manufactured to have a thickness of 5 μm to 2000 μm.

* * * * *